United States Patent [19]

Lee

[11] Patent Number: 5,389,703
[45] Date of Patent: Feb. 14, 1995

[54] METHOD OF MAKING HYBRID POLYMER OF EPOXY RESIN AND THE RESULTING PRODUCT

[75] Inventor: Hsueh-Chi Lee, Allentown, Pa.

[73] Assignee: Air Products and Chemicals, Inc., Allentown, Pa.

[21] Appl. No.: 133,936

[22] Filed: Oct. 12, 1993

[51] Int. Cl.$^6$ .................. C08K 3/20; C08L 63/02
[52] U.S. Cl. ..................... 523/406; 523/407; 523/412; 525/117; 525/119
[58] Field of Search ............ 523/406, 407, 412; 525/117, 119

[56] References Cited

U.S. PATENT DOCUMENTS

| | | | |
|---|---|---|---|
| 4,212,781 | 7/1980 | Evans et al. | 260/29.4 UA |
| 4,377,433 | 3/1983 | Merz et al. | 156/326 |
| 4,446,258 | 5/1984 | Chu et al. | 523/406 |
| 4,588,757 | 5/1986 | Minnis et al. | 523/406 |
| 4,973,614 | 11/1990 | Yoshino et al. | |
| 5,037,700 | 8/1991 | Davis | 428/414 |

Primary Examiner—Melvyn I. Marquis
Assistant Examiner—D. Aylward
Attorney, Agent, or Firm—Mark L. Rodgers

[57] ABSTRACT

Hybrid polymers of epoxy resins are provided by polymerizing ethylenically unsaturated monomer in the presence of epoxy resin using a combination of oil soluble and water soluble surfactants in separate organic and aqueous phases, respectively, made up prior to combining under polymerizing conditions. The organic phase contains the monomer and epoxy resin and oil soluble surfactant while the aqueous phase contains water and the water soluble surfactant. Initiator systems can be included in the organic phase or added independently to the reaction mixture. The resulting hybrid epoxy polymer exhibits excellent properties when applied as a protective film or adhesive, and aqueous dispersions of the polymer can be compounded with polyfunctional amine curatives and still remain stable for long periods of time, making a convenient one-pack system that can be cured on application, drying and heating at a relatively low temperature.

10 Claims, No Drawings

METHOD OF MAKING HYBRID POLYMER OF EPOXY RESIN AND THE RESULTING PRODUCT

FIELD OF THE INVENTION

This invention relates to a method of making a hybrid polymer of an epoxy resin. In another aspect it relates to preparing a stable aqueous dispersion of an epoxy-based hybrid polymer which is suitable for forming adhesive and protective films. In yet other aspects it relates to the products which result from these methods in the form of a hybrid polymer, an aqueous polymer dispersion and a protective film.

BACKGROUND OF THE INVENTION

Epoxy resins are widely used in industry for numerous applications including coatings and laminating adhesives. Manufacturers are not content simply to adapt their processes to the epoxy products available but insist that such resins be tailored to meet their needs. To remain competitive it is essential that suppliers of epoxy resins continually improve their products with their customers' requirements in mind.

One approach for modifying epoxy polymer products has been by combining the epoxy resin with other polymers which provide certain advantages in their physical properties and processibility. This is complicated by another objective which is to place the combined polymers in aqueous dispersion for handling and use in order to avoid toxicity and fire hazards associated with organic sol vents. Such combinations often have three serious disadvantages. One is incompatibility of the combined polymers, resulting in the final products having inferior mechanical strength and poor appearance. A second problem is instability of emulsions of the combined polymers owing to incompatibility of emulsions of each of the component polymers. The third difficulty frequently encountered is inadequate curing of the hybrid polymer because of the surfactant or emulsifier layer on the polymer particles of each constituent. In the past these problems have been addressed in different ways involving various polymerization recipes and blending sequences.

Evans, et al., U.S. Pat. No. 4,212,781 (1980) describes a method of modifying epoxy resins by graft polymerization. The addition monomer, such as an acrylate system, is polymerized by free radical initiation in the presence of the epoxy resin, either in the absence of a solvent or, preferably, in a two part system of miscible solvents, one of which dissolves the epoxy resin and the other the addition monomer, for example, benzene and ethanol. The product is said to be a blend of graft polymer, ungrafted polymerized addition polymer and unreacted epoxy resin. This solution of mixed polymers can be converted to an aqueous system by replacing the solvent 10 with water using a base such as dimethylethanol amine. This procedure, although complex, is said to produce a stable emulsion. Epoxy/acrylate hybrid polymers prepared by this process, however, have very limited epoxy groups left and are typically cured through the hydroxyl groups with either aminoplast resins or urea formaldehyde resins at high temperature.

Hybrid polymer products are sometimes made simply by blending different polymers together. Merz, et al., U.S. Pat. No. 4,377,433 (1983) describes a blended aqueous dispersion of (1) an epoxy compound, (2) a copolymer of a vinyl or acrylic acid ester and an ethylenically unsaturated monomer having hydroxy or carbonyl groups, and (3) an amine hardener. Stability (pot life) of this dispersion is said to be only from a few hours to about 2 weeks.

In an effort to solve this stability problem, Chu, et al., U.S. Pat. No. 4,446,258 (1984) modified one polymer so it would serve as a dispersant for the other. A can coating composition is described which is an aqueous dispersion of (1) a neutralized reaction product of an epoxy resin with an acid polymer, such as an acrylic prepolymer, and (2) a second resin, not necessarily self-dispersible in water, either preformed or prepared in the presence of (1). Stability of this mixture is said to be provided by the epoxy compound which acts as a polymeric surfactant. The coating composition can be cured with an agent such as an aminoplast or a phenoplast resin.

Minnis, et al., U.S. Pat. No. 4,588,757 (1986) discloses a two-part laminating adhesive which includes as one part an emulsion made by polymerization of ethylenically unsaturated monomers, such as an acrylate monomer system, in the presence of an epoxy resin. A polyfunctional amine is added as the second part at the time of use. It is said that the emulsion can be stored for an indefinite period of time before adding the amine. The object is to avoid use of solvents in the polymerization. The polyepoxides are emulsified in water using nonionic surfactants, although the surfactant used is said to be of secondary significance. Such surfactant can be an ethylene oxide adduct of octyl or nonyl phenols or long chain alcohols such as dodecanol. The acrylic monomers are also emulsified with a nonionic surfactant alone or with an anionic surfactant like sodium lauryl sulfate. These are water soluble emulsifiers commonly used in emulsion polymerization recipes. In the sole example, a preemulsion mixture of water, surfactant, epoxy compound and acrylate/acrylic acid monomer was added slowly to hot water containing persulfate initiator. Little grafting is said to be expected. This product, when blended with polyamine emulsion, is said to be a relatively stable mixture, but having a pot life of only about one week.

In a more recent approach to this problem, Davis, U.S. Pat. No. 5,037,700 (1991) discloses a laminating adhesive consisting of (1) an emulsified copolymer of acrylate, styrene or vinyl ester and an ethylenically unsaturated carboxylic acid, (2) an epoxy resin emulsion and (3) a polyfunctional amine. The copolymer (1) is prepared independently by aqueous emulsion polymerization using a suitable dispersant and then mixed with epoxy resin solids in aqueous emulsion. It is said that this mixture can be stored indefinitely, but the amine is added only at the time of using the adhesive to make a laminate.

It is highly desirable to find a way to make an aqueous emulsion of a hybrid epoxy resin which can be used in coating applications to provide a film having good clarity, water and solvent resistance, and adhesion to a number of different substrates. Preferably, such an emulsion should have stability over an extended period of time and be useful in a one-pack system which does not require the metering of two reactive components at the time of use. Also, the polymers should be curable at relatively low temperatures.

The concept of using various mixtures of surfactants, both oil soluble and water soluble surfactants, has been known for many years in the microemulsion field of technology and widely applied in the cosmetic, pharmaceutical and food industries. There is no known application of this concept, however, in emulsion or dispersion polymerization for the modification of epoxy resins, and apparently is little known or rarely utilized in the emulsion polymerization arts.

SUMMARY OF THE INVENTION

According to my invention improved hybrid epoxy polymer products are obtained by polymerizing ethylenically unsaturated monomer in the presence of epoxy resin using two different types of surfactants which are introduced into the polymerization system in a specific manner. One of the surfactants is referred to herein as "oil soluble" and the other as "water soluble". The oil soluble surfactant is introduced by using it in preparation of an emulsion of the ethylenically unsaturated monomer and the epoxy resin. An organic solvent can also be included in this emulsion which is referred to as the "organic phase". The water soluble surfactant is introduced by adding it to water in formation of an "aqueous phase". Initiator can be included in the organic phase or it can be added after the phases have been at least partially combined. The organic and aqueous phases are then mixed together under polymerization conditions for the monomer. Such polymerization conditions can be established during or after the phases are mixed and this mixing can take place all at the beginning of the polymerization, but preferably occurs by adding the organic phase to the polymerization mixture over a course of time. The polymerization is carried out to form an-aqueous emulsion of hybrid epoxy polymer which can be applied to a broad range of substrates with fast set speed and formation of a film which exhibits superior clarity, good water and solvent resistance, and excellent adhesion.

As a preferred embodiment of my invention, a water soluble polyfunctional amine is added to the emulsion of hybrid epoxy polymer to render the polymer curable without the necessity of additional additives. In this way a one-pack system is provided in which the hybrid epoxy polymer can be applied in the emulsion form, dried and cured at relatively low temperatures.

DETAILED DESCRIPTION OF THE INVENTION

This invention is a process for making hybrid epoxy polymers and their curable aqueous dispersions. The invention also includes the products of this process in the form of the hybrid epoxy polymer dispersion, a curable dispersion containing a polyfunctional amine curative, and a film which can be made form this curable dispersion as a protective coating, such as for beverage cans, or as an adhesive, binder or sizing agent. The process uses two types of surfactant or emulsifier in a procedure that uses each type of surfactant to the best advantage. One surfactant can be characterized as oil soluble and is used in preparing a premix of the epoxy resin and the ethylenically unsaturated monomers which are to be polymerized in the presence of the epoxy resin. This premix is referred to as the organic phase in describing my invention.

The other surfactant is characterized as water soluble and is used to prepare an aqueous phase with which the organic phase is combined under conditions which cause the ethylenically unsaturated monomer to polymerize. The combining of these two phases can take place in a batch operation before polymerization is initiated, but preferably only a portion of the organic phase is added to the aqueous phase initially and after polymerization has commenced the remainder of the organic phase is fed to the reaction mixture over a period of time in what is known as a delay feed. The polymerization can be promoted with either a thermal initiator or a redox initiator system. Optionally, another condensation polymer, such as polyurethane, can be included in the organic phase and incorporated into the polymeric product.

One of the benefits of the procedure of the invention is that the polymer particles become dispersed in aqueous suspension in an ultra-fine form. By this it is meant that the size of the suspended polymer particles is in the range of about 0.05 to 0.1 microns. It is believed that the ultra-fine nature of the suspended polymer particles is in part responsible for the exceptional stability of the dispersion, even after addition of a polyfunctional amine curative. Also, these particles interact with the mixed surfactants present in such a way that the cured film product formed from this dispersion exhibits excellent resistance to both water and solvent despite the fact that both water soluble and oil soluble surfactants are used in its preparation. The cured film also has good gloss and excellent clarity making it ideal for use as a protective coating. These results were quite surprising as was the pot or shelf life of the curable, one-pack dispersion of hybrid epoxy polymer. It was found that this dispersion, after addition of the curative, could be stored at room temperature for more than six months without showing any sign of gelling or settling.

The epoxy resins useful in the invention are polyepoxides, that is, resinous materials having a 1,2-epoxy equivalency greater than one. Such epoxy resins are well known and described in the *Handbook of Epoxy Resin*, Lee and Neville, McGraw-Hill, 1967. The preferred polyepoxides are polyglycidyl ethers, particularly polyglycidyl ethers of polyphenols such as bisphenol A. A number of such resins are available commercially or they can be made by known methods, for example, by the etherification of a polyphenol with epichlorohydrin in the presence of an alkali.

Other useful epoxy resins are the cycloaliphatic polyepoxides which can be made by epoxidation of cyclic olefins with organic peracids, for example, peracetic acid. These and the other epoxy resins can be used individually or in admixture to achieve certain desired results.

The epoxy resin or resin mixture preferably has an epoxid equivalent weight of about 150 to 2500, and more desirably from 170 to 1200. Commercially such resins are available from Shell Chemical Co. under the trade names Epon 828, Epon 1001, Epon 1004 and Epon 1510. Dow Chemical also markets such resins as DER-331, DER-661 and DER-664.

In this invention, the epoxy resin or resin mixture is normally present in amounts of about 5 to 60 weight percent, and preferably 10 to 40 weight percent of the total hybrid polymer after polymerization of the ethylenically unsaturated monomer.

The ethylenically unsaturated monomer or monomers used in the invention can vary broadly depending upon the desired end-use properties. The basic monomer system should include one or more of the monomers such as styrene, alpha-methyl styrene, C1 to C18 alkyl acrylates and methacrylates, for example, butyl acrylate and methyl methacrylate, C1 to C18 vinyl esters, for example, vinyl acetate, vinyl propionate, vinyl laurate, and vinyl esters of Versatic acids, and the C4 to C8 dialkyl maleates, for example dibutyl maleate, dioctyl maleate, dimethylamyl maleate, and the like. This list is not exhaustive but illustrates the type of monomer which is used for the basic modification of the epoxy resin in formation of the hybrid polymer. The proportion of such base monomers polymerized into the hybrid polymer is usually about 30 to 94 weight percent and preferably about 55 to 88 weight percent based upon the total polymer.

Although not essential, it is preferred that some of the monomers in the system contain functional groups such as hydroxyl, carboxyl, and epoxy groups which can be available for crosslinking during the curing step. Examples of such monomers include hydroxyethyl methacrylate, hydroxypropyl methacrylate, acrylic acid, methacrylic acid, crotonic acid, itaconic acid, propyl acrylic acid, maleic acid, maleic anhydride, glycidyl acrylate, glycidyl methacrylate, allylglycidyl ether, and the like. Preferred functional group-containing monomers are acrylic acid and methacrylic acid (containing carboxylic acid groups) and glycidyl methacrylate (containing epoxy or oxirane groups). The amount of such functional monomers, if used, is normally about 1 to 15 weight percent and preferably about 2 to 6 weight percent of the total hybrid polymer.

In addition to the above, a small proportion of the monomer mixture can be monomers having more than one ethylenically unsaturated double bond. These monomers tend to increase the molecular weight of the hybrid polymer by cross bonding during the polymerization. Examples of such monomers include butanediol diacrylate, 1,6-hexanediol diacrylate, trimethylolpropane triacrylate, triallyl cyanurate, and divinyl benzene. If used, it is preferred that the amount of such monomers having more than one double bond be about 0.1 to 0.5 weight percent of the total hybrid polymer. Excessive crosslinking in the system should be avoided to prevent gelation or the production of large amounts of coagulum.

It should be understood that reference to hybrid polymer of epoxy resin in this description of the invention does not necessarily mean that such hybrid polymer is entirely graft polymer or merely a polymer blend. In all likelihood, the product of polymerization is a mixture of polymers which nevertheless cooperate to provide consistent, reproducible properties. Some grafting probably occurs and this would contribute to the observed compatibility of the polymer product, but the polymerization mechanisms are complex, and the invention does not depend upon any particular structure for the polymeric product. The term "hybrid polymer" is meant, therefore, to encompass all the possible variants which result from the polymerization conditions described.

The surfactants are characterized as oil soluble and water soluble and in this way are differentiated. Suppliers of such products commercially frequently so identify their products and the distinction is an art recognized one. Such solubilities are related to the hydrophiliclipophilic balance of the surfactants and are quantified in terms of their HLB numbers. In general, surfactants having an HLB number below 15 are considered to be oil soluble and those having HLB numbers of 15 and above are water soluble. This numerical distinction is not rigorous, however, and for purposes of this invention should be used only as a guide. The safest test for solubility is an empirical one in which the desired proportion of surfactant is mixed with an amount of the organic or aqueous phase, as the case may be, and an observation make for cloudiness or haziness in the mixture. Such cloudiness or haziness is an indication of insolubility under the conditions of the test. For this invention, mixtures of the oil soluble surfactant and organic phase should be clear, as should mixtures of the water soluble surfactant and aqueous phase. More often than not, the oil soluble surfactants will have an HLB number within the 10 to 15 range, preferably in the range of 13 to 15, and the water soluble surfactants will have HLB numbers of 15 to 20. There may exist, under rare circumstances, a surfactant with an HLB number of 14 to 16 that can serve both roles. This would depend upon the nature of the organic phase and the amount of oil soluble surfactant used.

In general, the oil soluble surfactants are amphiphatic and include anionic, nonionic, cationic or amphoteric surfactants, depending upon the hydrophobic nature of the organic phase and the intended end use. Among the well known oil soluble surfactants which can be used are nonionic surfactants such as polyoxyethylene derivatives of fatty alcohols having 6 to 20 carbon atoms and up to 80% ethylene oxide, polyoxyethylene-polyoxypropylene block copolymers having ethylene oxide contents up to 804, anionic surfactants such as ammonium salts or sodium salts of sulfated alkylphenol ethoxylates, alkylaryl sulfonates of 6 to 10 carbons in the alkyl group, C10 to C22 alkyl sulfonates, di- or tri-alkyl sulfosuccinates having 6 to 12 carbon atoms in the alkyl group, C10 to C22 fatty acid salts, and carboxylated ethoxylated C10 to C22 alcohol s having ethylene oxide contents .up to 80; cationic surfactants such as quaternary ammonium salts containing one or two long alkyl chains, alkyl aryl ammonium salts, alkyl pyridinium salts, alkyl imidazoline salts, and oligomeric or polymeric amine salts. In certain situations, it is advantageous to use reactive or polymerizable surfactants. This type of surfactant generally has one or more ethylenically unsaturated groups in the lipophilic moiety. Common unsaturated groups include oleyl, linoleyl, dodecenyl, and the like. Mixtures of various types of surfactants can be used in the organic phase, for example, nonionic surfactants mixed with either anionic or cationic surfactants.

The preferred oil soluble surfactants are nonylphenol ethoxylates with 9 to 50 moles of ethylene oxide, ammonium salts of sulfated alkylphenol ethoxylate with 4 to 30 moles of ethylene oxide, and the sodium salt of dialkyl sulfosuccinate.

The amount of oil soluble surfactant used is about 0.05 to 10 weight percent, and preferably 0.5 to 5 weight percent based upon the total charge of monomer and epoxy resin.

The water soluble surfactants added to the aqueous phase in the invention are amphiphatic surfactants which can be of the general types described for the oil soluble surfactants but having a higher hydrophiliclipophilic balance. Although it is not necessary that the water soluble surfactants selected be chemically related to the oil soluble surfactants chosen, there are advantages in terms of compatibility of components in the final product if the oil soluble and water soluble surfactants used have similar chemical structures. For example, if the oil soluble surfactant is a polyoxyethylene derivative of fatty alcohols, the water soluble surfactant can be selected from the same type of compound but contain a higher number of ethylene oxide chains on the hydrophilic moiety. Similar analogies can be made with other series of compounds described as suitable oil soluble surfactants to arrive at a selection for the water soluble surfactant. Mixed surfactant systems containing, for example, nonionic type surfactants and anionic type surfactants can be used as the water soluble surfactant.

The amount of water soluble surfactant used is usually in the range of 0.05 to 10 weight percent, and preferably 0.5 to 5 weight percent of the total weight of the hybrid polymer. The total amount of surfactant, both oil soluble and water soluble, depends upon the monomer system and epoxy resin chosen for the recipe and the proportions of each in the recipe but is generally in the range of about 1 to 12, preferably 1 to 7, and even more desirably 2 to 5.5 weight percent of the total hybrid polymer.

Optionally, certain organic solvents can enhance the emulsification process and can be used in the-organic phase. Such organic solvents can also function as coalescing aids to improve the polymer film formation during the drying stage of the process. These solvents are generally either water soluble or water miscible. Examples of such solvents include glycols, glycol ethers, and glycol esters such as monoethyl ether of ethylene glycol, monobutyl ether of ethylene glycol, acetate ester of monoethyl or monobutyl ether of ethylene glycol, and the like. Mixtures of various types of organic solvents can be employed. If organic solvents are used, the amounts are generally about 1 to 15, preferably 3 to 7, weight percent of the total hybrid polymer dispersion.

The polymerization can be effected using conventional catalyst or initiator systems which are usually one or more of the water soluble free radical generating species such as sodium, ammonium, or potassium persulfate, and hydrogen peroxides. Other initiators with limited water solubility can be used, such as benzoyl peroxide, lauryl peroxide, cumene hydroperoxide, t-butyl hydroperoxide, t-butyl perbenzoate, t-amyl perbenzoate, and the like. Other azo-type initiators with limited water solubility such as azobisisobutyronitrile can be used. As is well known, persulfate and peroxide types of initiators can be activated by a redox system including a metal ion such as an iron ion and a reducing agent such as sodium sulfite, sodium bisulfite, sodium metabisulfite, sodium formaldehyde sulfoxylate, zinc formaldehyde sulfoxylate, ascorbic acid, erythorbic acid, tartaric acid, citric acid, glucose, sodium erythorbate, sodium ascorbate, and the like.

The amount of the initiator depends upon the one chosen, but is generally about 0.01 to 3, preferably 0.1 to 1.5, weight percent of the total monomers used. If desired, a reducing agent can be used in combination with a persulfate or peroxide to form a redox initiator system. The amount of reducing agent in such a case is typically 0.01 to 2.0, preferably 0.1 to 1.0, weight percent of the total monomer mixture.

The polymerization temperature can range from room temperature to that necessary to complete the reaction in a reasonable period of time, but generally does not exceed about 95° C., and preferably not over 85° C.

As is common in such polymer systems, other ingredients such as buffers and chain transfer agents can be employed in practicing the invention. Suitable buffering agents include various bicarbonates such as sodium, potassium or ammonium bicarbonate, sodium phosphate, disodium hydrogen phosphate, sodium acetate, and combinations thereof. Chain transfer agents such as lauryl mercaptan or dodecyl mercaptan can be used to regulate the molecular weight of the hybrid polymer.

The amount of chain transfer agent, if used, is typically about 0.01 to 2.0, preferably 0.05 to 0.5, weight percent of the total monomer system.

The hybrid epoxy polymer in the aqueous dispersions of the invention can be cured or crosslinked with a variety of curing agents. Preferred agents are water soluble polyfunctional amines containing primary and/or secondary active hydrogens, such as ethylene diamine, diethylene triamine, triethylene tetramine, isophorone diamine, tetraethylene pentamine, and the like. The polyfunctional amine is used in an amount such that there is present a stoichiometric amount, more or less, sufficient to react with the available epoxy functionality of the hybrid polymer in the dispersion. Suitably the stoichiometric ratio is 25 to 150%, preferably 50 to 125%, amine hydrogen to epoxy functionality. The compounded dispersion of curing agent and hybrid epoxy polymer can be applied as desired and dried to remove water, and the polymer cured at ambient, near ambient or elevated temperatures. Typical curing temperatures are from ambient temperature to 120° C., preferably 50 to 80° C.

One of the surprising features of the invention is that the hybrid epoxy polymer dispersions made in accordance with its procedure, when compounded with low molecular weight, water soluble, polyfunctional amines, have extended pot or shelf life with excellent storage stability. Apparently, the reaction between the amine and epoxy polymer is forestalled by the water, surfactants and form of the ultra fine polymer particles in the dispersion. Once the water is driven off, however, the cure is readily effected with minimal heating. This dispersion stability was demonstrated by showing no gelation, settling, or little change in pH or viscosity after six months of storage at ambient temperatures or after accelerated aging in a 50° C. oven for one week. This result established that the dispersions of this invention compounded with the amine curative are truly suitable for use as a one-pack system. The polyfunctional amine curatives preferred for this particular service are those having amine hydrogen equivalent weights of 5 to 60, and more preferably 10 to 30. Examples of such amines are ethylene diamine, diethylene triamine, and triethylene tetramine.

In addition to the polyfunctional amines, other curing agents that can be used to cure the hybrid epoxy polymer include water soluble aminoplast and phenoplast resins. These curatives require additional heating to effect a cure since they react through the hydroxyl groups present in the polymer. Examples of suitable aminoplast resins are hexamethoxymethyl melamine such as Cymel 303 and Cymel 307, methylol urea, and butylated urea formaldehyde resins. Examples of suitable phenoplast resins are polymethylol phenols esterified with an alkyl group. Other curing agents or catalysts suitable for one-pack coating systems in accordance with the invention include polycarboxylic acids, dibasic carboxylic acids, tertiary amines such as 2,4,6tri(dimethylaminoethyl)phenol, imidazoles such as 2-ethyl-4-methyl imidazole, dicyanodiamide, hydrazides, and the like.

Various additives commonly used with polymer emulsions or dispersions can be added to the compositions of this invention, such as coalescing agents, plasticizers, organic solvents, pigments, extenders, fillers, rheology modifiers, thickeners, leveling agents, defoamers, dispersing aids, surface active agents, pH adjusting agents and biocides.

The invention is further described in the following examples which are presented as illustrative and should not be construed to limit the invention unduly.

EXAMPLE 1

This example illustrates the method of preparing an aqueous dispersion of hybrid epoxy polymer and the curing of the polymer in a film. The weight ratio of epoxy resin to ethylenically unsaturated monomer in the polymerization mixture was about 10 to 90.

The equipment used included a glass reactor equipped with a mechanical stirrer, a temperature control device, a reflux condenser, a nitrogen purge device and delay feed funnels. The polymerization recipe was as follows:

| Phase | Ingredient | Parts by Weight |
| --- | --- | --- |
| Aqueous: | Deionized water | 300.0 |
| | 20% Igepal CO-890[1] | 50.0 |
| | 5% Siponate DS-10[2] | 80.0 |
| | Sodium bicarbonate | 0.4 |
| Organic: | Butyl acrylate | 114.0 |
| | Methyl methacrylate | 230.0 |
| | Acrylic acid | 8.0 |
| | 2-Hydroxyethyl methacrylate | 8.0 |
| | Epon 828 epoxy resin[3] | 40.0 |
| | Igepal CO-720[4] | 6.0 |
| | Aerosol TR-70[5] | 2.0 |
| Initiator: | 2% potassium persulfate[6] | 120.0 |

[1] Nonylphenoxypoly(ethyleneoxy)ethanol type nonionic surfactant with 40 moles of ethylene oxide and an HLB number of 17.8, in water. Commercially available from Rhone-Poulenc Surfactants and Specialties.
[2] Sodium dodecyl benzene sulfonate anionic surfactant, in water. Commercially available from Rhone-Poulenc Surfactants and Specialties.
[3] Bisphenol A/epichlorohydrin based epoxy resin with epoxide equivalent weight of 185–192. Commercially available from Shell Chemical Company.
[4] Nonylphenoxypoly(ethyleneoxy)ethanol type nonionic surfactant with 12 moles of ethylene oxide and an HLB number of 14.2. Commercially available from Rhone-Poulenc Surfactants and Specialties.
[5] Sodium bistridecyl sulfosuccinate anionic surfactant. Commercially available from American Cyanamid Company.
[6] In water.

The aqueous phase was charged to the reactor by adding the Igepal and Siponate to the water followed by the sodium bicarbonate buffer. This phase was then mixed for 10 minutes. The organic phase was prepared by dissolving Epon 828 in the acrylic monomer mixture followed by adding the Igepal and Aerosol oil soluble surfactants. This phase was then mixed for sufficient time (at least 30 minutes) to allow the epoxy resin and surfactants to become completely solubilized in the monomer mixture.

The aqueous phase in the reactor was agitated at 200 to 250 rpm while being heated to 60°–65° C. Forty parts of initiator were then charged to the reactor followed by 88 parts of organic phase in about 10 minutes. The mixture was purged with nitrogen for 10 minutes and the temperature increased to 73°–77° C. for initiation. After initiation of polymerization, the temperature was adjusted to about 77°–80° C. and held for 10 minutes. While holding the temperature at 77°–80° C., the remainder of the organic phase and initiator were added to the reactor over a two hour period, after which the reactor temperature was raised to 85° C. and held there for one hour. The reaction mixture was then cooled to room temperature and filtered through 200-mesh cheese cloth.

The resulting dispersion had a Brookfield viscosity of 40 cps (spindle No. 2, 50 rpm, Model RVT), a solids content of 44.2%, and a pH of 3.3.

The pH of the resulting dispersion was adjusted to about 10.0 by adding 1.05 parts of 33% ethylenediamine in water solution per 100 parts by weight of the dispersion. This was about 100% of the stoichiometric requirement. Even though the ethylenediamine is an amine curative for epoxy resin, the dispersion of hybrid epoxy polymer remained fluid and stable after six months storage at room temperature. This was quite surprising. A sample of the dispersion was further tested by storing it in a 50° C. oven for one week. No gelation or settling was observed.

Ten mill wet drawdowns of the ethylenediamine-compounded hybrid epoxy polymer dispersion were cast on glass plates and phosphated cold rolled steel panels, Bonderite 1000, and air dried at room temperature for 30 minutes the then cured at 80° C. in an oven for 2 hours. The drawdowns were made in a conventional manner by applying the liquid dispersion to the panel surface and pulling a drawbar across the surface to obtain an even coating of desired thickness. The cured hybrid epoxy polymer films showed excellent transparency, high gloss, good water and solvent resistance, and excellent adhesion to both glass and steel. Solvent resistance was tested by rubbing the film surface 200 times, back and forth, with a cloth which had been soaked in methyl ethylketone.

EXAMPLE 2 (Comparative)

This example was made for comparative purposes to evaluate the function of the oil soluble surfactant in the organic phase. The recipe and procedure were the same as in Example 1 except that the Igepal and Aerosol surfactants were omitted. A large amount of coagulum was found during the run and because the dispersion was of very poor quality, no attempt was made to cure and cast the polymer. This dispersion had a solids content of 39.64, a Brookfield viscosity of 25 cps (same basis as Example 1), and a pH of 3.7.

EXAMPLE 2A (Comparative)

This example was made for comparative purposes to demonstrate the necessity of using a water-soluble surfactant. Example 1 was repeated except that Igepal CO-890 and Siponate DS-10 water-soluble surfactants were not added to the deionized water. A slower initiation was noted and an intermediate amount of coagulum was formed during the run. The resulting dispersion had a solids content of 41.24, a Brookfield viscosity of 20 cps (spindle No.2, 50 rpm, RVT), and a pH of 2.9.

EXAMPLE 3

The procedure of Example 1 was followed except that the recipe was modified so that the weight ratio of epoxy resin to monomer was about 20 to 80. The aqueous phase recipe and the initiator were the same as in Example 1. In the organic phase the butyl acrylate was increased to 148 parts, the methyl methacrylate decreased to 76 parts, 80 parts of vinyl acetate were added, and the Epon 828 was increased to 80 parts. Otherwise the recipe was as in Example 1.

The resulting dispersion had a viscosity of 52 cps (same basis as in Example 1), a solids of 43.84, and a pH of 3.8.

The pH of the resulting dispersion was adjusted to about 7.5 with 33% ethylenediamine in water solution. The polyamine compounded hybrid epoxy polymer dispersion showed both good room temperature storage stability (greater than six months) and good oven aging stability (over 1 week at 50° C.). A film of the cured polymer from the one-pack dispersion was made on a glass plate as in Example 1 and showed good clarity, high gloss, good water and solvent resistance, and excellent adhesion.

EXAMPLE 4

This example illustrates one way to practice the invention with a redox initiator system. The weight ratio of epoxy resin to ethylenically unsaturated monomer mixture was about 20 to 80.

The equipment was the same as used in Example 1, but the recipe was as follows:

| Phase | Ingredient | Parts by Weight |
|---|---|---|
| Aqueous: | Deionized water | 188.0 |
| | 20% Igepal CO-890 | 16.0 |
| | 5% Siponate DS-10 | 63.0 |
| Organic: | Butyl acrylate | 126.0 |
| | Methyl methacrylate | 64.0 |
| | Acrylic acid | 3.0 |
| | Methacrylic acid | 2.0 |
| | 2-Hydroxyethyl methacrylate | 5.0 |
| | Epon 828 epoxy resin | 50.0 |
| | Abex EP-110[1] | 10.0 |
| | Igepal CO-720 | 3.1 |
| Oxidant: | t-Butyl hydroperoxide (70%)[2] | 2.1 |
| Reductant: | Erythorbic acid | 1.5 |
| | Ferrous ammonium sulfate (1%)[3] | 0.5 |
| | Deionized water | 23.0 |
| Diluent: | Deionized water | 50.0 |

[1]Ammonium salt of sulfated nonylphenoxypoly(ethyleneoxy)ethanol type anionic surfactant. Commercially available from Rhone-Poulenc Surfactants and Specialties.
[2]In water. Commercially available from Aldrich Chemical Company.
[3]In water.

The aqueous phase was prepared by mixing the ingredients for 10 minutes. The organic phase was made by dissolving the epoxy resin in the acrylic monomer mixture, adding the Igepal and Abex oil soluble surfactants, and mixing for at least 30 minutes to allow the resin and surfactants to become completely solubilized in the monomer mixture. Then the oxidant was added and mixing continued for another 5 minutes.

The reductant mixture was made by dissolving the reducing agent, erythorbic acid, in the water followed by adding the ferrous ammonium sulfate as a catalyst for the redox reaction.

The aqueous phase was introduced into the reactor and agitated at 200 to 250 rpm. The organic phase was then added to the reactor over a 10 minute interval and the reactor was purged with nitrogen for 10 minutes. The reactor temperature was raised to 35° C. and 5 parts of the reductant was introduced into the reactor to initiate the polymerization. When initiation was observed, the reactor temperature was adjusted to 55°–60° C. over a 20 minute period. While holding the reaction temperature at about 60° C., the remainder of the reductant and the diluent were added over a period of 2 hours. The reaction temperature was then raised to 65° C. and held there for 30 minutes, after which the reaction mixture was cooled, discharged and filtered through 200-mesh cheese cloth.

The resulting dispersion had a Brookfield viscosity (same basis as Example 1) of 80 cps, a solids content of 43.2%, and a pH of 3.5.

The pH of this dispersion was adjusted to 10.1 with 33% diethylenetriamine in water solution (about 100 of stoichiometric based on the epoxy resin). This polyamine compounded hybrid epoxy polymer dispersion showed good room temperature storage stability. A cured hybrid polymer film of this one-pack composition applied to a glass plate as in Example 1 showed good clarity, high gloss, good water and solvent resistance, and excellent adhesion.

EXAMPLE 5

This example shows another Variation in the monomer system used to make the hybrid epoxy polymer. The weight ratio of epoxy resin to monomer was about 30 to 70. The equipment and procedure was as in Example 1 unless otherwise noted. The recipe was as follows:

| Phase | Ingredient | Parts by Weight |
|---|---|---|
| Aqueous: | Deionized water | 288.0 |
| | 20% Igepal CO-890 | 8.3 |
| | 5% Siponate DS-10 | 16.6 |
| Organic: | Butyl acrylate | 120.0 |
| | Styrene | 20.0 |
| | Methyl methacrylate | 74.6 |
| | Methacrylic acid | 3.6 |
| | Acrylic acid | 9.0 |
| | 2-Hydroxyethyl methacrylate | 9.0 |
| | 1,6-Hexanediol diacrylate | 0.8 |
| | Epon 828 epoxy resin | 99.4 |
| | Igepal CO-720 | 4.3 |
| | Aerosol TR-70 | 2.9 |
| | Abex EP-110 | 11.5 |
| Initiator: | 2% Potassium persulfate | 126.0 |
| Surfactant: | 20% Igepal CO-890 | 33.1 |
| | 5% Siponate DS-10 | 66.3 |

The ingredients were as further defined in the previous Examples. The procedure was as in Example 1 except the additional surfactant not included initially in either the aqueous or organic phases was charged to the reactor along with the remainder of the organic phase and the initiator during the delay addition period.

The resulting hybrid epoxy polymer dispersion had a viscosity of 48 cps (same basis as Example 1), a solids content of 43.8%, and a pH of 3.8. The pH of this dispersion was adjusted to 9.22 with 33% diethylenetriamine in water solution (75% of stoichiometric). The polyamine compounded hybrid epoxy polymer dispersion had good room temperature storage stability and showed no gelation or settling in 4 months. A cured hybrid polymer film of the one-pack composition on a glass plate obtained as in Example 1 showed good clarity, high gloss, good hardness and toughness, good water and solvent resistance, and excellent adhesion.

EXAMPLE 6

This example illustrates the preparation of a water-based hybrid epoxy polymer dispersion containing an aliphatic type of epoxy resin. An oil soluble thermal initiator was used for the monomer polymerization. The weight ratio of epoxy to monomer was about 20 to 80. The equipment and procedure was as in Example i unless otherwise noted. The recipe was as follows:

| Phase | Ingredient | Parts by Weight |
|---|---|---|
| Aqueous: | Deionized water | 365.0 |
| | 20% Igepal CO-890 | 50.0 |
| | 5% Siponate | 80.0 |
| | Sodium bicarbonate | 0.4 |
| Organic: | Butyl acrylate | 151.0 |
| | Methyl methacrylate | 150.0 |
| | Methacrylic acid | 3.0 |
| | Acrylic acid | 8.0 |
| | 2-Hydroxyethyl methacrylate | 8.0 |

-continued

| Phase | Ingredient | Parts by Weight |
|---|---|---|
| | 1,6-Hexanediol diacrylate | 0.8 |
| | Epon 1510 epoxy resin[1] | 80.0 |
| | Igepal CO-720 | 6.0 |
| | Aerosol TR-70 | 4.0 |
| Initiator: | 10% VAZO 64[2] | 24.0 |

[1]Hydrogenated bisphenol A/epichlorohydrin based epoxy resin with epoxy equivalent weight of 210–238. Commercially available from Shell Chemical Company.
[2]2,2-azobisisobutyronitrile in N-methyl pyrrolidone.

The procedure of Example 1 was followed except that 41 parts of the organic phase and 6 parts of the initiator were first charged to the reactor to start the polymerization, and the remainder of the organic phase and initiator were fed into the reactor over a 2 hour period. A post treat of 2 parts of Igepal CO-720 in 30 parts of deionized water was added to the reaction mixture during the cool down period.

The resulting hybrid epoxy polymer dispersion had a viscosity (same basis as Example 1) of 80 cps, a solids content of 44.1%, and a pH of 4.5. The pH of the dispersion was adjusted with 33% diethylenetriamine in water solution. The polyamine compounded hybrid epoxy polymer dispersion had good room temperature storage stability and showed no gelation or settling in 6 months. A cured hybrid epoxy polymer film of the one-pack composition on a glass plate obtained as in Example 1 showed good clarity, high gloss, good hardness, good water and solvent resistance, and excellent adhesion.

Hybrid epoxy polymer compositions of our invention can be cured at relatively low temperatures and show excellent properties making them useful for a broad range of applications, including coatings, textile sizings, woven and nonwoven binders, and adhesives. In addition, when compounded in emulsion form with water soluble polyfunctional amine, aqueous dispersions of these hybrid epoxy polymers are very stable, having a pot life of several months, enabling their use as truly a one-pack system, a great convenience for the manufacturer using these epoxy products.

Other embodiments, advantages and features of my invention will be apparent to those skilled in the art from the foregoing disclosure without departing from the spirit or scope of the invention.

I claim:

1. A method of making a hybrid polymer of an epoxy resin and an ethylenically unsaturated monomer system which comprises:
   (a) preparing an organic phase containing said epoxy resin, said monomer system and an oil soluble surfactant;
   (b) preparing an aqueous phase containing water and a water soluble surfactant;
   (c) combining said phases of steps (a) and (b) under polymerization conditions; and
   (d) polymerizing monomer in said monomer system to form a water-based emulsion of said hybrid polymer.

2. The method of claim 1 wherein said organic phase is added to said aqueous phase over a period of time during said polymerizing.

3. The method of claim 1 wherein said epoxy resin is a polyglycidyl ether of a polyphenol.

4. The method of claim 3 wherein said epoxy resin has an epoxid equivalent weight of 150 to 2500 and makes up from 5 to 60 weight percent of said hybrid polymer.

5. The method of claim 3 wherein said monomer system includes acrylate monomer.

6. The method of claim 5 wherein said monomer system also contains one or more monomers selected from styrene, vinyl esters, dialkyl maleates and monomers which have functional groups selected from hydroxy, carboxy and epoxy.

7. The method of claim 6 wherein said monomer system also contains monomer having more than one ethylenically unsaturated double bonds capable of introducing crosslinking into said hybrid polymer.

8. The method of claim 4 wherein each of said surfactants is present in an amount of about 0.05 to 10 weight percent based upon said hybrid polymer.

9. A water-based emulsion of a hybrid polymer of an epoxy resin made by the method of claim 1.

10. The water-based emulsion of claim 9 wherein said hybrid polymer is present as ultra-fine polymer particles in the size range of 0.05 to 0.1 microns.

* * * * *